UNITED STATES PATENT OFFICE.

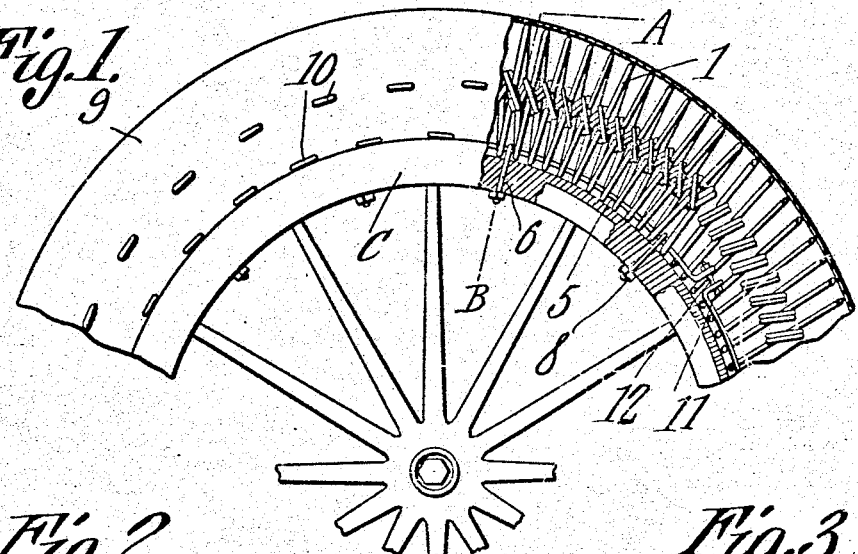
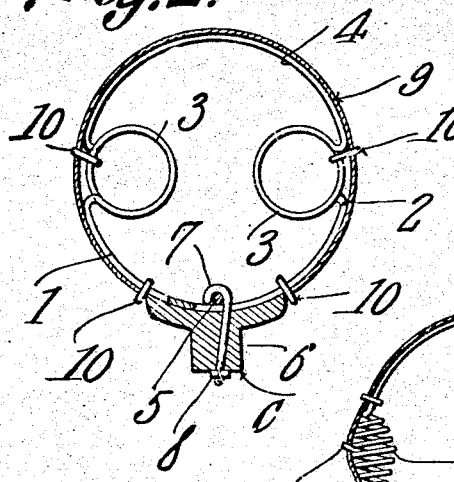
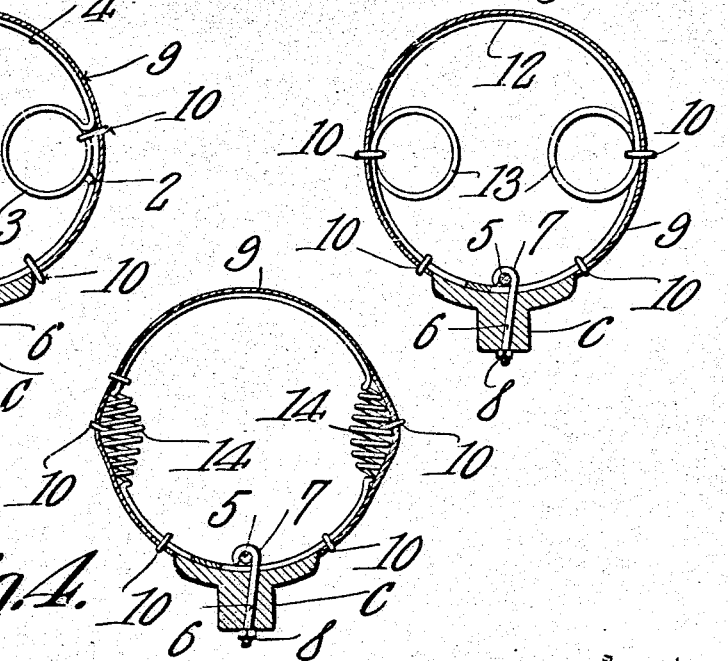

SAMUEL GRUNEWALD, OF VAN WERT, OHIO.

WHEEL-TIRE.

971,267.  Specification of Letters Patent.  Patented Sept. 27, 1910.

Application filed March 3, 1910. Serial No. 547,092.

*To all whom it may concern:*

Be it known that I, SAMUEL GRUNEWALD, a citizen of the United States, residing at Van Wert, in the county of Van Wert and State of Ohio, have invented a new and useful Wheel-Tire, of which the following is a specification.

This invention relates to tires of that type particularly designed for use upon the wheels of automobiles, motor cycles and the like and its object is to provide a tire having a spring body in the form of an endless helix the convolutions of which include means whereby the resiliency of the tire is greatly increased.

A further object is to provide a simple means whereby the spring body of the tire can be detachably secured to the wheel rim.

Another object is to provide a spring body capable of being used either with or without a cover.

With these and other objects in view the invention consists of certain novel details of construction and combination of parts hereinafter more fully described and pointed out in the claims.

In the accompanying drawings the preferred form of the invention has been shown.

In said drawings,—Figure 1 is a view partly in elevation and partly in section of a portion of a wheel having the present improvements combined therewith. Fig. 2 is a section on line A—B of Fig. 1, said section being on an enlarged scale. Fig. 3 is a view similar to Fig. 2 and showing a slightly modified construction. Fig. 4 is a transverse section through another modified form of tire.

Referring to the figures by characters of reference 1 designates a spring wire coiled to form the body of the tire and each convolution of the coil being provided, at diametrically opposed points, with supplemental coils whereby the resiliency of the tire is increased. As shown in Fig. 2 the wire constituting each convolution can be folded inwardly upon itself at each side, as indicated at 2 and then coiled inwardly within a plane extending transversely through the tire body so as to form a complete eye 3. These two opposed eyes extend inwardly toward each other and are connected by the outer arcuate portion 4 of the convolution and which, together with the corresponding portions of the remaining whirls, constitutes the tread portion of the tire.

The tire body may be attached to the wheel rim C by means of a hoop 5 mounted upon the innermost portions of the convolutions and extending through said convolutions, the said hoop being clamped upon the tire body so as to bind it against the rim, the clamping means being preferably in the form of bolts 6 extending through the rim and having hooks 7 which straddle the hoop 5. Nuts 8 may be mounted on the bolts for the purpose of tightening them.

If preferred, and as shown in the drawings, the tire body 1 may be provided with a cover 9 of leather, fabric, rubber or the like, this cover, if desired, being formed of the outer tube of an ordinary pneumatic tire. The said cover can be attached to the tire body in any preferred manner, as by means of laces 10 threaded through it and through the eyes 3 at the sides of the tire and around the inner portions of the convolutions of the tire body close to the rim C.

As shown in Fig. 1 the ends of the hoop 5 may be provided with outturned eyes 11 engaged by a bolt 12. It will be seen therefore that after the hoop has been placed in the tire body it can be drawn tightly around the rim so as to firmly clamp said body onto the rim, the bolts 6 coöperating with the band to additionally hold it in place and to also prevent the tire from creeping upon the wheel rim.

By referring to the drawing it will be noted that a tire such as has been described has the appearance of an ordinary pneumatic tire. Not only does the spring wire body yield under a load because of the inherent elasticity of the material constituting the wire and which is obtained by the use of ordinary continuous whirls of a coiled spring, but also because of the provision of the diametrically opposed inwardly extending supplemental coils which permit the wire body 1 to yield to a greater extent than would otherwise be the case and thus more efficiently absorb vibrations produced by the movement of the tire over a rough surface.

If preferred, and as shown in Fig. 3, the inwardly directed supplemental coils may be formed by looping the side portions of the convolutions 12 inwardly, as indicated at 13 or, and as disclosed in Fig. 4, each convolution may be provided at diametrically opposed points with a spiral supplemental spring 14 the whirls of which gradually increase in size toward its center, the longitudinal axis of this supplemental spring constituting a continuation of the curve of the convolution. While both of the modifications shown in Figs. 3 and 4 operate to efficiently absorb vibrations, the structure shown in Figs. 2 and 3 are particularly desirable because they do not produce any objectionable lateral bulging of the tire cover.

It is to be understood that, if desired, a plurality of independent springs may be employed in lieu of the continuous springs shown. In such event each spring may be fastened in any suitable manner to the band 5 and said band then attached to the rim.

It is of course to be understood that various other changes may be made in the construction and arrangement of the parts without departing from the spirit or sacrificing any of the advantages of the invention as defined in the appended claims.

What is claimed is:—

1. A tire consisting of a coiled spring having supplemental coils integral with diametrically opposed portions of each convolution, a flexible cover inclosing the coils and normally stretched thereby, and means laced through the cover for securing the same to said supplemental coils.

2. A tire consisting of a main coiled spring having supplemental coils integral with diametrically opposed portions of each convolution of the main spring, the convolutions of the supplemental coils extending about axes constituting continuations of the curves of the convolutions of the main spring.

3. A tire consisting of a main coiled spring having each convolution provided at diametrically opposed points with supplemental coils extending around axes following the curvature of the convolution of the main spring, and a flexible cover inclosing the coil and secured to a supplemental coil at each side of the main spring.

In testimony that I claim the foregoing as my own, I have hereto affixed my signature in the presence of two witnesses.

SAMUEL GRUNEWALD.

Witnesses:
 H. W. BLACHLY,
 O. W. KERNS.